United States Patent [19]

Bailey

[11] 4,450,761

[45] May 29, 1984

[54] NUTCRACKER TABLE

[76] Inventor: Hillard W. Bailey, 754 Cravens Ave., San Antonio, Tex. 78223

[21] Appl. No.: 456,867

[22] Filed: Mar. 21, 1983

[51] Int. Cl.³ .............................................. A23N 5/00
[52] U.S. Cl. ...................................... 99/580; 99/571; 99/581; 108/25; 108/94
[58] Field of Search ........................... 99/568, 571–573, 99/574–580, 581–583, 497–500; 30/120.1, 120.2, 120.3; D7/98; 108/25, 94

[56] References Cited

U.S. PATENT DOCUMENTS 3,127,917  4/1964  Turner .................................. 99/582
4,344,359  8/1982  Frechou et al. ..................... 99/580

Primary Examiner—Timothy F. Simone

[57] ABSTRACT

This table is designed to be used for a patented inertia-type nutcracker. Primarily, it consists of a top with legs, and it includes a plurality of openings through it, for supporting receptacles which receive shelled and unshelled nuts. It further includes an opening and a pair of pegs, for rendering the nutcracker stationary when in use.

1 Claim, 6 Drawing Figures

U.S. Patent May 29, 1984 4,450,761
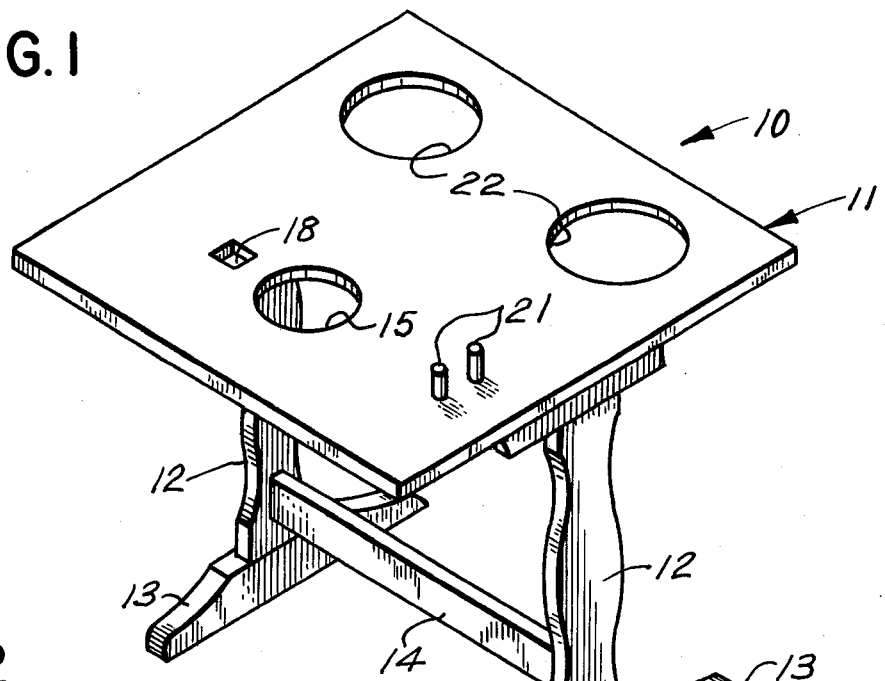
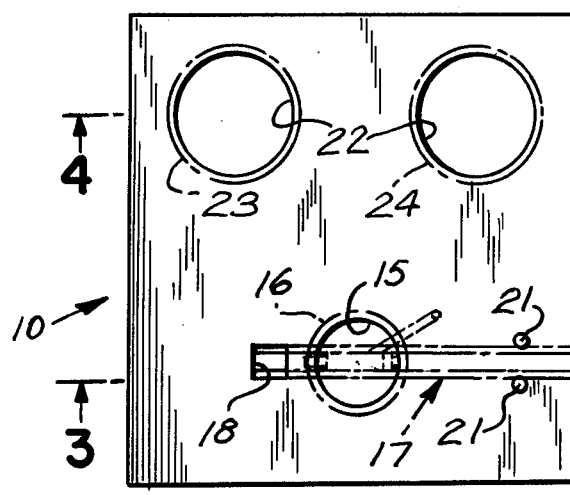
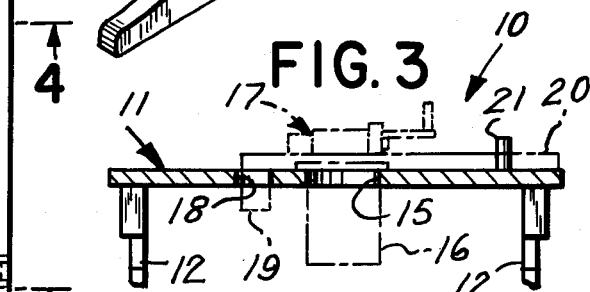
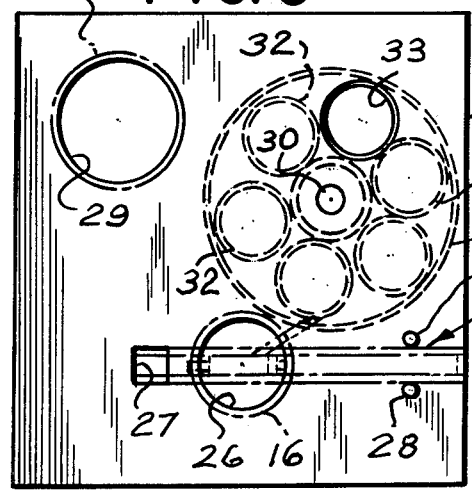
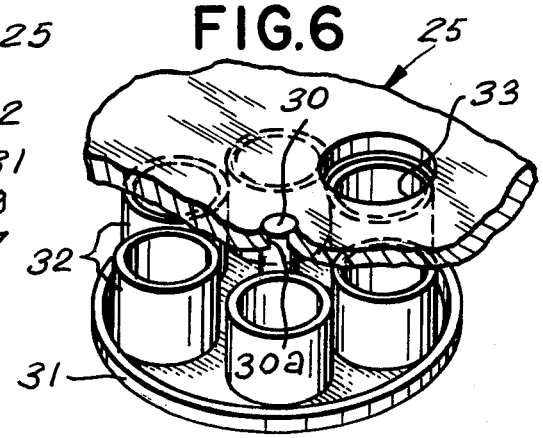

NUTCRACKER TABLE

This invention relates to table, and more particularly, to a nutcracker table.

The principal object of this invention is to provide a nutcracker table, which will be employed for use with the Texas Native Nutcracker, manufactured by the Inertia Nutcracker Company, which holds the patents on Inertia Nutcracker, U.S. Pat. Nos: 3,127,917 and 3,524,486.

Another object of this invention is to provide a nutcracker table, which will be of such design, as to provide easy access to receptacles, which will hold shelled and unshelled nuts.

Another object of this invention is to provide a nutcracker table, which will render the nutcracker stable on the table, so as to prevent any movement thereof, when it is in use.

A further object of this invention is to provide a nutcracker table, which will hold a receptacle for broken shell particles that fall through, so as to prevent broken shell particle build-up on the table.

A still further object of this invention is to provide a nutcracker table, which will be twenty eight inches high, so as to accommodate a standard chair for the comfort of the user for long periods of time.

Other objects are to provide a nutcracker table, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention;

FIG. 2 is a top plan view of FIg. 1, illustrating the nutcracker and receptacles in phantom lines;

FIG. 3 is a cross-sectional view, taken along the line 3—3 of FIG. 2;

FIG. 4 is a cross-sectional view, taken along the line 4—4 of FIG. 2;

FIG. 5 is a top plan view of a modified form of the invention, which illustrates, in phantom, an indexing turntable, holding empty pre-measured nut receptacles, and FIG. 6 is a fragmentary perspective view of FIG. 5.

According to this invention, a table 10 is shown to include a square configurated top 11, having a pair of legs 12 with foot portions 13. A cross-bar 14 is fixedly secured at each end to the legs 12, in a suitable manner, and an opening 15, through top 11, provides for removably receiving a receptacle 16, which will receive shell particles from nutcracker 17. Nutcracker 17 is received over opening 15, and an adjacent square opening 18 serves to receive the off-set projection 19 of the base 20 of nutcracker 17. On the opposite side of opening 15 are a pair of upwardly extending and spaced-apart pegs 21, which are fixedly secured in openings of top 11, (not shown), which serve to stablize and prevent movement of the base 20 of nutcracker 17. A pair of spaced-apart openings 22, through top 11 on the opposite side of table 10, removably receive receptacles 23 and 24, which serve to contain shelled and unshelled nuts, respectively, and it shall be noted, that the receptacles 16, 23, and 24 are flanged at their top ends, so as to prevent them from falling through their respective openings 15 and 23.

In use, the base 20 of nutcracker 17 is positioned between pegs 21, and the projection 19 thereof is received in the square opening 18. When nutcracker 17 is used, the shells fall through opening 15, and into the receptacle 16 beneath nutcracker 17. The nuts to be cracked are removed from either of the receptacles 23 or 24, depending upon which ever one is used to hold the shelled or unshelled nuts.

Referring to FIGS. 5 and 6 of the drawing, a modified table top 25 is shown to include an opening 26 for receptacle 16, an opening 27 for projection 19 of base 20 of nutcracker 17, a pair of pegs 28 for base 20, and an opening 29 for receptacles 23 or 24. A flanged spindle 30 is secured in opening 30a of top 25. The bottom of spindle 30 is fixedly secured to a circular tray 31, which receives a plurality of receptacles 32, that will receive a pre-determined amount of unshelled nuts through opening 33 of the top 25, when tray 31 is rotated manually by the user.

In use, table top 25 functions in the same aforementioned manner as described of top 11 of table 10, with the exception, that the rotatable tray 31 enables the placement of a plurality of nut-receiving receptacles 32, which will be used one after the other, by alignment with opening 33 when tray 31 is rotated.

While various changes may be made in the detail construction, it is understood that such changes will be within the spirit and scope of the present invention, as is defined by the appended claims.

I claim:

1. A nutcracker table, comprising, in combination, a table-top mounted upon a pair of legs having a stretcher cross-bar therebetween, and a wide foot at a lower end of each said leg; a first and second, spaced-apart, circular openings through said table-top for removably fitting flanged receptacles therein respectively to contain unshelled nuts and receive broken nut shell particles, a square opening and a pair of pegs on said table-top being located at opposite sides of said second opening for stationarily supporting a Texas Native Nutcracker therebetween and bridging across said second opening; and a rotatable, circular tray under said table-top supporting a plurality of receptacles and a third circular opening through said table-top for selective alignment with said tray-supported receptacles for receiving unshelled nuts.

* * * * *